(No Model.)

C. M. ALLEN.
CONDUIT ELECTRIC RAILWAY SYSTEM.

No. 540,569. Patented June 4, 1895.

Witnesses,
J. H. Nourse
J. F. Ascheck

Inventor,
Charles M. Allen
By Dewey & Co.
Attys

UNITED STATES PATENT OFFICE.

CHARLES MILTON ALLEN, OF SAN FRANCISCO, CALIFORNIA.

CONDUIT ELECTRIC-RAILWAY SYSTEM.

SPECIFICATION forming part of Letters Patent No. 540,569, dated June 4, 1895.

Application filed October 3, 1894. Serial No. 524,822. (No model.)

*To all whom it may concern:*

Be it known that I, CHARLES MILTON ALLEN, a citizen of the United States, residing in the city and county of San Francisco, State of California, have invented an Improvement in Conduits for Underground Electric Railways; and I hereby declare the following to be a full, clear, and exact description of the same.

My invention relates to an improvement in underground conduits for electrical railways.

It consists in a novel means for transmitting the current from a main conductor to the moving car by means of a series of successive contacts which are made as the car passes and are broken immediately after; and in details of construction which will be more fully explained by reference to the accompanying drawings, in which—

Figure 1:
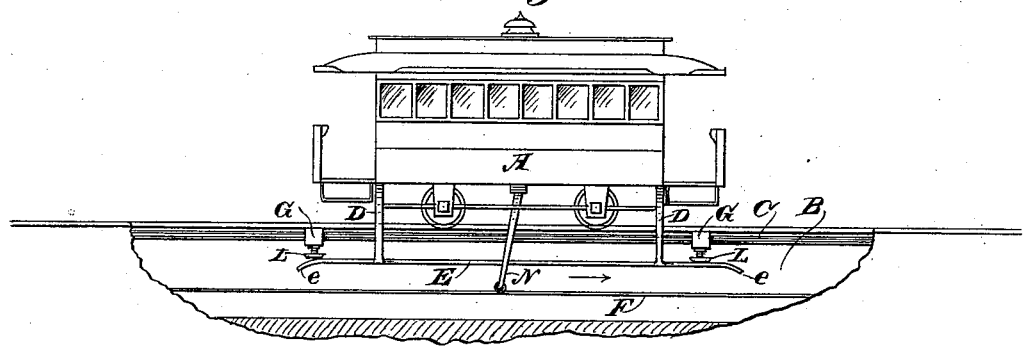
Figure 2:
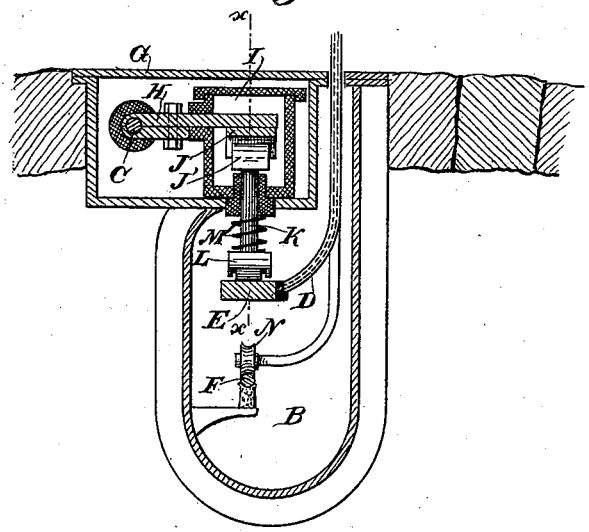
Figure 3:
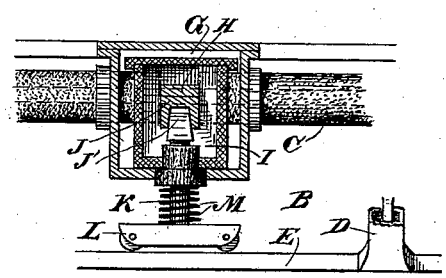
Figure 4:
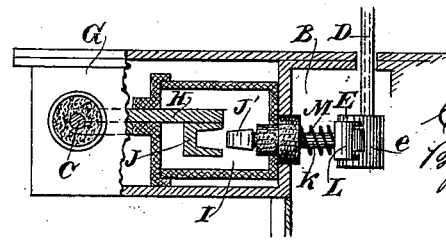

Figure 1 is a side elevation and section of the conduit, showing a car and the contact-bar and the boxes. Fig. 2 is a section through one of the contact-boxes, taken at right angles to the main conductor, showing the contact being made from below. Fig. 3 is a section through the same on line $x$ $x$ of Fig. 2. Fig. 4 shows the construction of the box when making contact from the side of the box.

A represents a car of any construction which is adapted to travel upon the rails of a track, and in any suitable relation to these rails is a tube or tunnel B, within which, or to one side as may be preferred, is the main conductor C, which is preferably inclosed in an outer box or casing, and suitably insulated to prevent leakage of the current.

The conduit has a slot in the upper part, and at one side of the center, and through this slot, hollow arms D extend downward from the car to which they are attached, and have fixed upon their lower ends a contact bar E which is insulated from the arms D, and lies within the tube or tunnel and essentially in line with it, having the ends bent downwardly as shown at $e$. The bars or arms D, by which it is suspended, are made hollow and within them are conductors which connect the bar with the motor mechanism of the car, so that when a current of electricity is transmitted to this bar, it will pass through its conductors to the motor, and may thence be returned by a conducting arm and trolley N to the wire F supported upon insulated brackets within a tube or tunnel, and which will serve to return the current to the source of electrical energy.

Within the tube or tunnel and beneath that portion which forms the roof at one side of the slot, are contact boxes G which are situated at a distance apart, a little less than the length of the contact bar E, so that this bar will always be connected with one of the contact plates within the boxes and will make contact with the next one before it is disengaged from the preceding one. These boxes are connected with the main conductor by clamps H which pass through the insulating material of the conductor and extend into an inner insulating box I within which are the contact plates J J'. One of these plates J is fixed to the clamp H and is stationary. The other plate J' is connected with a shank K which extends out through the sides of the boxes I and G, being properly insulated therefrom, and movable in and out, so that when the shank or rod K is moved inwardly it forces the plates J and J' into contact with each other, and when moved outwardly it disengages these contact plates.

The contact plates are made preferably as shown in Figs. 2, 3 and 4, one having tapering sides, and the other corresponding and adapted to fit therein when contact is made, so as to insure a good contacting surface.

Upon the outer end of the shank K is a roller or contact piece L and the contact bar E carried by the car travels with relation to these rollers so as to engage them successively.

M is a spring by which the shank K and its roller are pressed out, and the contact plates J J' are normally held apart from each other.

The operation will then be as follows: When the car approaches one of the rollers L, contact is made between the bar E and the roller, and the latter is forced in so that the contact plates J and J' are brought together. An electrical current then passes from the main conductor C through the clamps H, contact plates J and J', shank K and roller L to the contact bar E, whence it is transmitted to the motor on the car as previously described. As soon as the contact bar has passed the roller of any of the contact boxes, the roller will be immediately depressed by the action of the spring M and the contact plates separated. The current is thus only drawn from the main conductor at the instant when the car is passing and at all other times the conductor being insulated, will retain the current and there will be no loss by leakage.

Having thus described my invention, what I claim as new, and desire to secure by Letters Patent, is—

1. An underground conduit for electrical railways having a series of contact boxes fixed therein and at one side of the slot or opening, an insulated main conductor extending along the line of said contact boxes, insulated boxes within the first named boxes, stationary contact plates within said insulated boxes and connected with the main conductor, movable plates also within the interior insulated boxes having shanks extending through said boxes and provided with rollers, a contact bar supported from the car and adapted to travel with it to form contact with the rollers and force the contact plates together as it passes, and means for withdrawing the movable contact plate from the stationary one.

2. In an electrical railway, an underground conduit having a slot made in the side of the upper part, a contact bar carried within the conduit by insulated suspending arms attached to a car having conductors passing through the arms from the contact bar to connect with the motor machinery of the car, contact boxes fixed at intervals within the upper part of the tube or tunnel and near the line of travel of the contact bar of the car, interior insulated boxes containing within them stationary plates, clamps extending from the main conductor through one side of the interior insulated boxes, and connected with the stationary contact plates therein whereby said plates are connected directly with the main conductor extending along the line of the tube or tunnel in close proximity with said contact boxes, and movable contact plates, the shanks of which extend outwardly through another side of the boxes and have rollers upon their outer ends with which the contact bar of the car impinges as it passes, so as to force the interior plates into contact with each other, and a spring by which they are withdrawn as soon as the bar has passed.

In witness whereof I have hereunto set my hand.

CHARLES MILTON ALLEN.

Witnesses:
 B. HEINRICH,
 GEO. T. SAMUELLS.